(12) United States Patent
Lorenz et al.

(10) Patent No.: US 9,647,782 B2
(45) Date of Patent: May 9, 2017

(54) FRAME SYNCHRONIZATION FOR DATA TRANSMISSION OVER AN OPTICAL NETWORK

(71) Applicants: Alcatel-Lucent USA Inc., Murray Hill, NJ (US); Alcatel-Lucent, Boulogne Billancourt (FR)

(72) Inventors: Diana L. Lorenz, Naperville, IL (US); Wayne R. Wilcox, Oswego, IL (US); Mark G. Bradac, Genoa, IL (US); Robert A. Novotny, Naperville, IL (US); Steven C. Martin, Naperville, IL (US); Greg A. Martin, Lisle, IL (US); Olivier Klein, Antony (FR)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 188 days.

(21) Appl. No.: 14/576,994

(22) Filed: Dec. 19, 2014

(65) Prior Publication Data
US 2016/0182218 A1    Jun. 23, 2016

(51) Int. Cl.
H04J 3/06    (2006.01)
H04J 3/16    (2006.01)

(52) U.S. Cl.
CPC .......... *H04J 3/0602* (2013.01); *H04J 3/1652* (2013.01)

(58) Field of Classification Search
None
See application file for complete search history.

(56) References Cited

U.S. PATENT DOCUMENTS 8,291,254 B2    10/2012    Chard et al.
8,326,364 B2    12/2012    Chard et al.
(Continued)

FOREIGN PATENT DOCUMENTS

EP    2602948 A1    6/2013
EP    2685645 A1    1/2014
WO    2015113643 A1 *  8/2015

OTHER PUBLICATIONS

"CPRI Specification V4.2," http://www.cpri.info, 2010 [retrieved on Nov. 14, 2014] Retrieved from the Internet: <URL: http://www.cpri.info/downloads/CPRI_v_4_2_2010-09-29.pdf> (113 pages).
(Continued)

*Primary Examiner* — Gary Mui
(74) *Attorney, Agent, or Firm* — Mendelsohn Dunleavy, P.C.; Yuri Gruzdkov

(57) ABSTRACT

We disclose an interface device configured to inter-convert CPRI data frames and Optical Transport Units (OTUs). The interface device acquires frame synchronization by temporarily storing data in a buffer bank such that translated sync characters are placed at respective predetermined locations within the buffer bank. Each translated sync character represents, in the corresponding OTU, a respective sync character of a CPRI hyperframe. The interface device is configured to distinguish translated sync characters from payload-data words of identical value based on predetermined alignment, in the buffer bank, of data temporarily stored therein for conversion into the CPRI data format. The interface device advantageously enables multiplexing of a plurality of CPRI links and aggregation and encapsulation of the multiplexed CPRI data into a stream of OTUs for transmission to the intended destination over an Optical Transport Network.

24 Claims, 7 Drawing Sheets

(56) References Cited

U.S. PATENT DOCUMENTS

| | | | |
|---|---|---|---|
| 8,599,827 B2 | 12/2013 | Irvine | |
| 2007/0091896 A1* | 4/2007 | Liu | H04J 3/1617 |
| | | | 370/395.5 |
| 2011/0228831 A1* | 9/2011 | Hirata | H04J 3/0682 |
| | | | 375/224 |
| 2013/0100948 A1 | 4/2013 | Irvine | |
| 2014/0003565 A1* | 1/2014 | Yamamoto | H04L 7/0087 |
| | | | 375/359 |
| 2014/0355991 A1* | 12/2014 | Cameirao | H04B 10/2575 |
| | | | 398/79 |
| 2015/0180575 A1* | 6/2015 | Bruckman | H04J 3/1652 |
| | | | 398/115 |
| 2015/0229397 A1* | 8/2015 | Shibata | H04B 10/25754 |
| | | | 398/115 |
| 2015/0244840 A1* | 8/2015 | Chakrabarti | H04L 61/6059 |
| | | | 370/328 |

OTHER PUBLICATIONS

"CPRI Specification V6.0," http://www.cpri.info, 2013 [retrieved on Nov. 14, 2014] Retrieved from the Internet: <URL: http://www.cpri.info/downloads/CPRI_v_6_0_2013-08-30.pdf> (128 pages).

"ITU-T Rec. G.709/Y.1331 (Feb. 2012) Interfaces for the optical transport network," http://www.itu.int, 2012 [retrieved on Sep. 12, 2014] Retrieved from the Internet: <URL: https://www.itu.int/rec/dologin_pub.asp?lang=e&id=T-REC-G.709-201202-I!!PDF-E&type=items> (238 pages).

\* cited by examiner

100

204

206

300

600

700

FRAME SYNCHRONIZATION FOR DATA TRANSMISSION OVER AN OPTICAL NETWORK

BACKGROUND

Field

The present disclosure relates to optical communication equipment and, more specifically but not exclusively, to methods and apparatus for data transmission over an optical network.

Description of the Related Art

This section introduces aspects that may help facilitate a better understanding of the disclosure. Accordingly, the statements of this section are to be read in this light and are not to be understood as admissions about what is in the prior art or what is not in the prior art.

Radio base stations often employ remote radio equipment that communicates with the baseband unit using a standardized transmission protocol, such as the CPRI (Common Public Radio Interface). For example, CPRI Specification V4.2 (2010 Sep. 29) and CPRI Specification V6.0 (2013 Aug. 30), which are incorporated herein by reference in their entirety, define a digital interface between the Radio Equipment Control (REC) and the Radio Equipment (RE). The use of the CPRI advantageously affords mobile network operators wider design options, e.g., based on various combinations of REC and RE units manufactured by different vendors. Different vendors may in turn capitalize on their respective strengths by focusing on the development and manufacture of either REC units or RE units, as the two types of units rely on substantially different technologies.

In general, the CPRI Specification assumes the use of a synchronous, dedicated link between the corresponding REC and RE units. However, certain base-station architectures may benefit from links aggregation and multiplexing. Development of methods and apparatus that enable such aggregation and multiplexing in an efficient and transparent manner is therefore in order.

SUMMARY OF SOME SPECIFIC EMBODIMENTS

Disclosed herein are various embodiments of an interface device configured to inter-convert CPRI data frames and Optical Transport Units (OTUs). The interface device acquires frame synchronization by temporarily storing data in a buffer bank such that translated sync characters are placed at respective predetermined locations within the buffer bank. Each translated sync character represents, in the corresponding OTU, a respective sync character of a CPRI hyperframe. The interface device is configured to distinguish translated sync characters from payload-data words of identical value based on predetermined alignment, in the buffer bank, of data temporarily stored therein for conversion into the CPRI data format. The interface device advantageously enables multiplexing of a plurality of CPRI links and aggregation and encapsulation of the multiplexed CPRI data into a stream of OTUs for transmission to the intended destination over an Optical Transport Network (OTN).

According to one embodiment, provided is an apparatus comprising a first interface device configured to be coupled between a first plurality of communication links and an optical trunk of an optical network and further configured to convert data frames between a first frame format used for data transmission over the first plurality of communication links and a second frame format used for data transmission over the optical network, wherein the first interface device comprises: a line coder configured to interconvert sync characters that appear in the first frame format and translated sync characters that appear in the second frame format; and a buffer bank coupled to the line coder, wherein the first interface device is configured to acquire frame synchronization by temporarily storing data in the buffer bank such that each of the translated sync characters is placed in the buffer bank at a respective predetermined location.

According to another embodiment, provided is a communication method comprising the step of converting data frames between a first frame format used for data transmission over a first plurality of communication links and a second frame format used for data transmission over an optical network. The step of converting comprises the sub-steps of: inter-converting, using a line coder, sync characters that appear in the first frame format and translated sync characters that appear in the second frame format; and acquiring frame synchronization by temporarily storing data in a buffer bank coupled to the line coder such that each of the translated sync characters is placed in the buffer bank at a respective predetermined location.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

As used herein, the term Optical Transport Network (OTN) refers to optical networks configured to use the ITU-T G.709/Y.1331 standard for WDM signals, which standard is incorporated herein by reference in its entirety. OTN transport uses a standardized digital wrapper that can carry a wide range of services transparently across the corresponding optical network. In various embodiments disclosed herein, various pertinent features of the ITU-T G.709/Y.1331 standard are leveraged to carry one or more CPRI links across an optical network. It is envisioned that at least some of the disclosed embodiments may advantageously be used to provide aggregation, concentration, and multiplexing of multiple streams of radio data corresponding to a wireless cell for transmission over an optical network.

Figure 1:
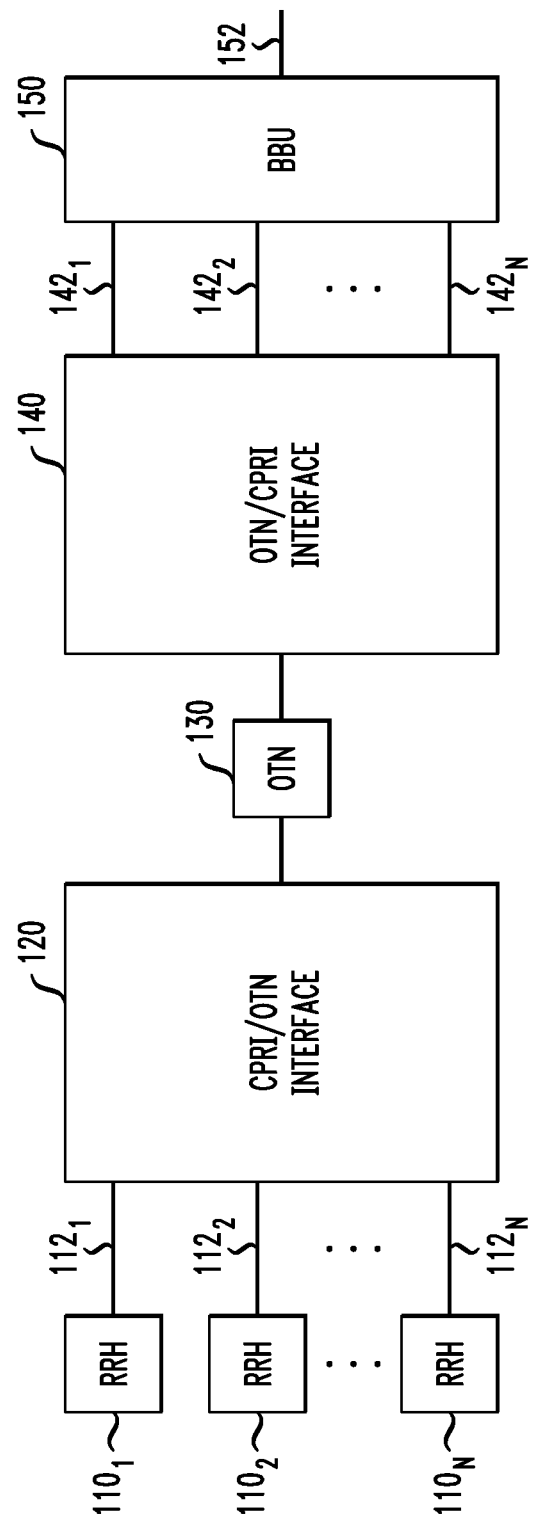
FIG. 1 shows a block diagram of a communication system according to an embodiment of the disclosure.

FIG. 1 shows a block diagram of a communication system 100 according to an embodiment of the disclosure. In an example embodiment, system 100 can be configured to support the operation of a wireless cell. As such, system 100 is capable of establishing and supporting communication links between a plurality of remote radio heads (RRHs) $110_1$-$110_N$ and a baseband unit (BBU) 150, where N is a positive integer greater than one. Embodiments in which N=1 are also contemplated. In an alternative embodiment, system 100 may be configured to support communication links between radio heads $110_1$-$110_N$ and a plurality of baseband units, each analogous to baseband unit 150. Example configurations for connecting multiple baseband units and multiple radio heads are disclosed, e.g., in the above-cited CPRI Specifications.

Each of remote radio heads $110_1$-$110_N$ is configurable for establishing and supporting one or more wireless links with one or more mobile devices, e.g., cell phones (not explicitly shown in FIG. 1). Baseband unit 150 is connected to a backbone network, e.g., via a link 152, as indicated in FIG. 1. The latter connection enables communication signals generated by and/or intended for the mobile devices that are wirelessly linked to remote radio heads $110_1$-$110_N$ to be appropriately directed, through system 100, to and from the corresponding remote parties (not explicitly shown in FIG. 1). In various embodiments, link 152 may be used to connect baseband unit 150 to mobile switching center (MSC) or a Evolved Packet Core (EPC), neither of which is explicitly shown in FIG. 1.

One of ordinary skill in the art will understand that a remote radio head 110 is an example of the Radio Equipment (RE), as this term is used in the above-cited CPRI Specifications. Similarly, baseband unit 150 is an example of the Radio Equipment Control (REC), as this term is used in the above-cited CPRI Specifications.

Each of remote radio heads $110_1$-$110_N$ is configured to communicate with baseband unit 150 using a respective first dedicated CPRI link 112, a respective OTN link established over an optical network 130, and a respective second dedicated CPRI link 142. In some embodiments, a remote radio head 110 may be configured to use more than one dedicated CPRI link 112 and/or more than one dedicated CPRI link 142.

CPRI links $112_1$-$112_N$ are interfaced with optical network 130 via a CPRI/OTN interface 120. CPRI links $142_1$-$142_N$ are similarly interfaced with optical network 130 via an OTN/CPRI interface 140. In various embodiments, CPRI links $112_1$-$112_N$ and $142_1$-$142_N$ may be electrical links or optical links. When CPRI links $112_1$-$112_N$ and $142_1$-$142_N$ are optical links, interfaces 120 and 140 operate to perform optical-to-electrical-to-optical conversion using appropriately configured optical receivers and transmitters. When CPRI links $112_1$-$112_N$ and $142_1$-$142_N$ are electrical links, each of interfaces 120 and 140 operates to perform (i) electrical-to-optical conversion for signals flowing in the CPRI-to-OTN direction and (ii) optical-to-electrical conversion for signals flowing in the OTN-to-CPRI direction. Various embodiments of electrical circuits that can be used in interfaces 120 and 140 are described in more detail below in reference to FIGS. 2-7.

The end-to-end communication links between remote radio heads $110_1$-$110_N$ and baseband unit 150 are typically bidirectional. A constituent unidirectional link configured to carry data from a remote radio head 110 to baseband unit 150 is referred to as an uplink. A constituent unidirectional link configured to carry data from baseband unit 150 to a remote radio head 110 is referred to as a downlink.

Figure 2A:
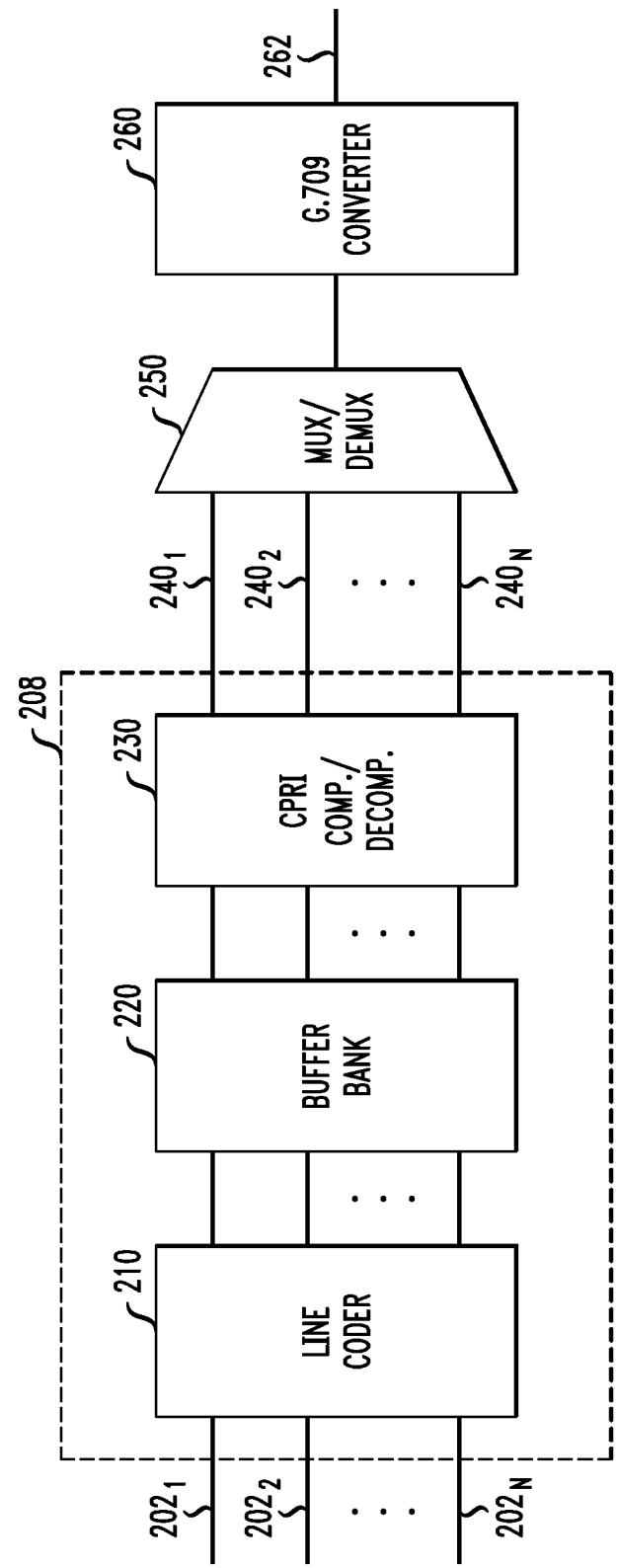
FIGS. 2A-2C show block diagrams of an electrical interface circuit that can be used in the communication system of FIG. 1 according to an embodiment of the disclosure.
Figure 2B:
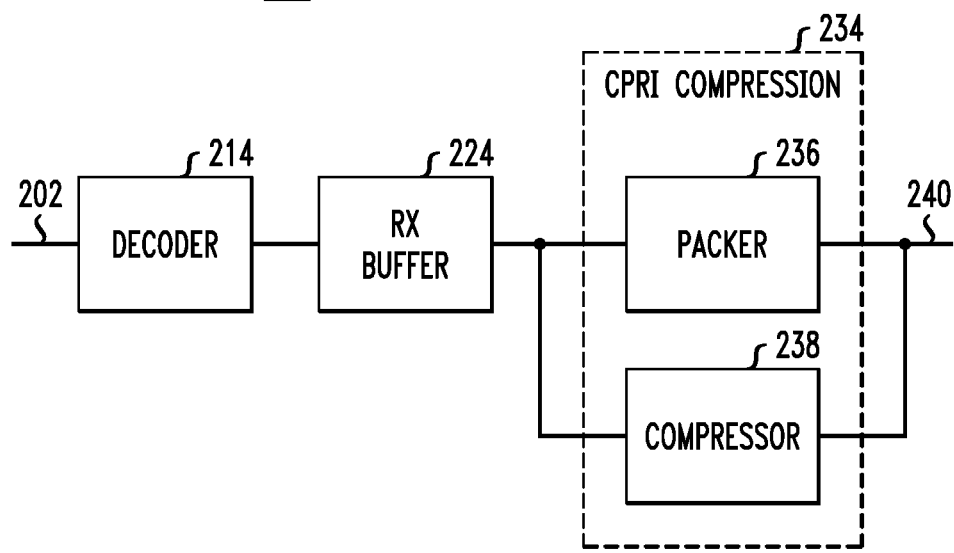
Figure 2C:
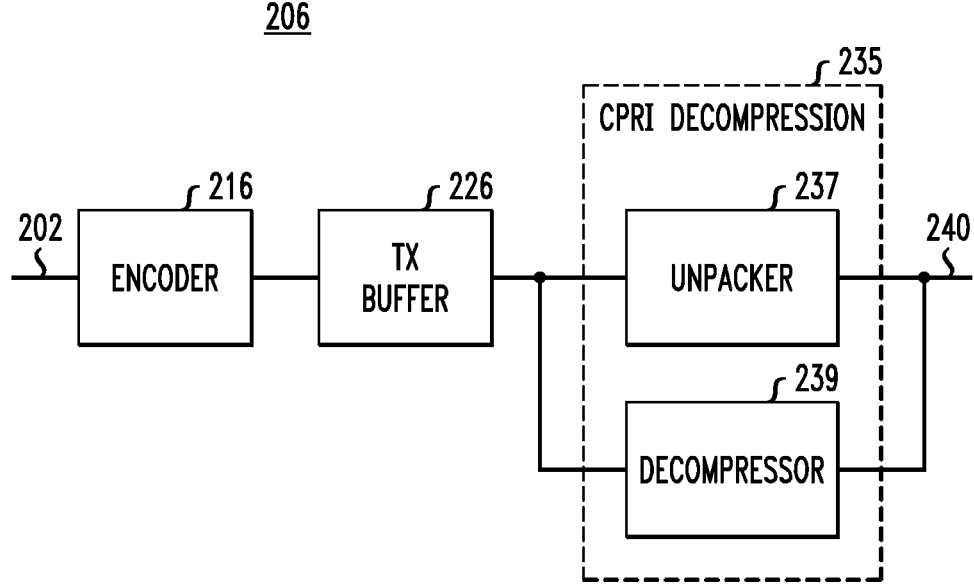

FIGS. 2A-2C show block diagrams of an electrical interface circuit 200 that can be used in communication system 100 according to an embodiment of the disclosure. More specifically, FIG. 2A shows an overall block diagram of circuit 200. FIG. 2B shows a data channel 204 of circuit 200 configured for data transmission in the CPRI-to-OTN direction. FIG. 2C shows a data channel 206 of circuit 200 configured for data transmission in the OTN-to-CPRI direction.

In one example embodiment, circuit 200 may be used in CPRI/OTN interface 120. In another example embodiment, circuit 200 may be used in OTN/CPRI interface 140. In some embodiments, circuit 200 may be configurable and programmable for use either in CPRI/OTN interface 120 or in OTN/CPRI interface 140. One of ordinary skill in the art will understand how to connect circuit 200 to optical and/or electrical transceivers to properly configure it for use in the corresponding embodiment of interface 120 or 140 (FIG. 1).

In an example configuration, each of first ports $202_1$-$202_N$ of circuit 200 is coupled (directly or through a corresponding optical transceiver) to a corresponding one of CPRI links $112_1$-$112_N$ or $142_1$-$142_N$ (FIG. 1). A second port 262 is coupled (through a corresponding optical transceiver) to a corresponding optical trunk of optical network 130 (FIG. 1). In operation, circuit 200 may transport data from first ports $202_1$-$202_N$ to second port 262 and/or from second port 262 to first ports $202_1$-$202_N$. When circuit 200 is used in interface 120, the data transmission from first ports $202_1$-$202_N$ to second port 262 implements an uplink, and the data transmission from second port 262 to first ports $202_1$-$202_N$ implements a downlink. When circuit 200 is used in interface 140, the data transmission from first ports $202_1$-$202_N$ to second port 262 implements a downlink, and the data transmission from second port 262 to first ports $202_1$-$202_N$ implements an uplink.

Circuit 200 includes a CPRI frame-handling module 208 that has N bidirectional data channels (not explicitly shown in FIG. 2A, see FIGS. 2B-2C) and comprises a line coder 210, a buffer bank 220, and a compressor/de-compressor circuit 230. Data channel 204 shown in FIG. 2B is a data channel in module 208 that is configured to direct data from the corresponding one of first ports $202_1$-$202_N$ to the corresponding one of electrical lines $240_1$-$240_N$ that connect module 208 and a multiplexer/de-multiplexer (MUX/DE-MUX) 250. Data channel 206 shown in FIG. 2C is a data channel in module 208 that is configured to direct data from the corresponding one of electrical lines $240_1$-$240_N$ to the corresponding one of first ports $202_1$-$202_N$. In an example embodiment, different channels in line coder 210 are configurable to operate as encoders or decoders, with the actual configuration being dependent on the direction of the data flow.

According to the above-cited CPRI Specification V6.0 (2013 Aug. 30), data received at or applied to a port 202 may be encoded using an 8B/10B line code or a 64B/66B line code. For illustration purposes, the description of data channels 204 (FIG. 2B) and 206 (FIG. 2C) provided below assumes the use of an 8B/10B line code. Based on the provided description, one of ordinary skill in the art will understand the operation of data channels 204 and 206 in an embodiment corresponding to the use of a 64B/66B line code.

Referring to FIG. 2B, data channel 204 comprises a line-code decoder 214, a receiver buffer 224, and a CPRI-format compression module 234. Decoder 214 is a part of line coder 210 (FIG. 2A). Receiver buffer 224 is a part of buffer bank 220 (FIG. 2A). CPRI-format compression module 234 is a part of compressor/de-compressor circuit 230 (FIG. 2A).

Decoder 214 is configured to use the operative 8B/10B line code to decode the data received at port 202 and translate them from the 10-bit format to the 8-bit format. The translated data generated by decoder 214 are then temporarily stored in receiver buffer 224 in a manner that causes the start of each CPRI basic frame to be at a known location within the receiver buffer. Recall that the data transmitted over a CPRI link, such as any one of CPRI links $112_1$-$112_N$ or $142_1$-$142_N$ (FIG. 1), are organized using a frame hierarchy that is based on the standard UMTS (Universal Mobile Telecommunications System) 10-ms radio frame. There are 256 CPRI basic frames in each CPRI hyperframe, and 150 CPRI hyperframes in each UMTS radio frame. The 256 control words of a CPRI hyperframe are organized into 64 control sub-channels of four control words each. The control sub-channels are typically numbered 0 through 63. The first word of the control sub-channel number 0 is referred to as the sync word of a hyperframe. Decoder 214 operates to find the sync word of the received hyperframe and then write the corresponding translated data into receiver buffer 224 such that the translated sync word is placed at the predetermined location within the buffer, which causes the start of each CPRI basic frame to also be placed at a respective known location within the receiver buffer.

In an example embodiment, the sync word of a CPRI hyperframe is a 10-bit control character of the operative 8B/10B line code. As known in the art, the control characters within an 8B/10B line code are 10-bit symbols that are valid sequences of bits (e.g., comprising no more than six ones or zeros) that do not have corresponding data bytes in the 8-bit format. As such, in conventional devices, control characters are not normally translated into the 8-bit format, and are usually discarded once the corresponding control function has been performed. In an example 8B/10B line code, the following twelve 10-bit control characters may be used: K.28.0, K.28.1, K.28.2, K.28.3, K.28.4, K.28.5, K.28.6, K.28.7, K.23.7, K.27.7, K.29.7, and K.30.7. Within this set of control characters, the K.28.1, K.28.5, and K.28.7 characters are referred to as comma characters.

In some embodiments, the sync word of a hyperframe may be a comma character. For illustration purposes and without undue limitation, the subsequent description is given in reference to an example embodiment wherein the sync word of a hyperframe is the K.28.5 comma character. From the provided description, one of ordinary skill in the art will understand how to make and use alternative embodiments that employ other control characters.

In an example embodiment, line decoder 214 is configured to translate the 10-bit control character that represents the sync word of a hyperframe into the designated specific 8-bit value. When an 8-bit word having this designated specific 8-bit value has been generated by decoder 214 as a result of the translation of the corresponding 10-bit sync character, said 8-bit word is referred to as the "translated sync character." For example, line decoder 214 may be configured to translate the 10-bit K.28.5 character into the binary 10111100 or the hexadecimal 0xbc.

Note that a CPRI basic frame might also have payload words that, after being translated into the 8-bit format, fortuitously come out as having the same designated specific 8-bit value as the translated sync character. For example, not every hexadecimal 0xbc in the 8-bit format of a translated CPRI basic frame corresponds to the 10-bit K.28.5 character. This property of the 8-bit-formatted CPRI data stream has implications for the operation of data channel 206 (FIG. 2C) because that data channel needs to properly translate the 8-bit-formatted data back into the 10-bit format. As such, data channel 206 needs to be able to distinguish the 0xbc values corresponding to the K.28.5 sync characters and the fortuitous 0xbc values corresponding to the payload data.

CPRI compression module 234 is configured to read out the translated CPRI basic frames from receiver buffer 224 and then compress/compact them for further multiplexing in MUX/DEMUX 250 (FIG. 2A) and aggregation and encapsulation into Optical Transport Units (OTUs) in converter 260 (FIG. 2A) in accordance with the ITU-T G.709/Y.1331 standard. In an example embodiment, CPRI compression module 234 comprises a packer sub-module 236 and a compressor sub-module 238.

Packer sub-module 236 is configured to handle the data in the translated CPRI basic frame that are not intended for compression/compaction. These data include, e.g., control information and all non-compressed I/Q data. Packer sub-module 236 operates to discard all unused bits in the translated CPRI basic frame, and then pack the remaining bits as closely together as possible for output on line 240. The operation of packer sub-module 236 is clocked using a clock that is common to all supported CPRI links. The common clock is enabled by buffer bank 220 (FIG. 2A) in general, and receiver buffer 224 in particular, because these buffers can accommodate the different amounts of jitter/wander between the different link-specific clocks. As a result, different packer sub-modules 236 in different data channels 204 can be synchronized so that the different packer sub-modules can all work on the same word of the respective CPRI basic frames at the same time, thereby operating on the common clock. Even though the data from different CPRI links are unlikely to be written into the corresponding receiver buffers 224 in a basic-frame-aligned fashion, the use of the common clock does cause these data to appear on the respective lines 240 in such fashion.

Compressor sub-module 238 is configured to compress/compact the I/Q data by performing one or more of the following: (i) removing redundancies; (ii) applying block scaling; and (iii) re-quantizing the scaled data. Additional details on possible structure, operation, and configuration of compressor/de-compressor circuit 230 in general, and compressor sub-module 238 in particular, can be found, e.g., in commonly owned European Patent Application No. EP 2,602,948, which is incorporated herein by reference in its entirety.

Referring to FIG. 2C, data channel 206 comprises a line-code encoder 216, a transmitter buffer 226, and a CPRI decompression module 235. In an example embodiment, CPRI decompression module 235 comprises an unpacker sub-module 237 and a decompressor sub-module 239. Encoder 216 is a part of line coder 210 (FIG. 2A). Transmitter buffer 226 is a part of buffer bank 220 (FIG. 2A). CPRI decompression module 235 is a part of compressor/de-compressor circuit 230 (FIG. 2A).

As already indicated above, data channel 206 is configured to transmit data in the direction that is opposite to the transmission direction of data channel 204 (FIG. 2B). Accordingly, the roles of line-code encoder 216, transmitter buffer 226, and CPRI decompression module 235 in data channel 206 are the reverse of the roles of line-code decoder 214, receiver buffer 224, and CPRI compression module 234, respectively, in data channel 204. For example, unpacker sub-module 237 operates to (i) restore the spacing of the data to that in the original translated CPRI data stream and (ii) place the data into transmitter buffer 226 such that the translated CPRI basic-frame boundaries are at known locations within the transmitter buffer. Encoder 216 operates to (i) retrieve the data from transmitter buffer 226 and (ii)

apply the operative 8 B/10 B line code to regenerate the CPRI basic frames in the original 10-bit encoded format. To properly place the unpacked and decompressed data in transmitter buffer 226, CPRI decompression module 235 relies on configuration data shared by interfaces 120 and 140, e.g., using out-of-band mechanisms. In an example embodiment, CPRI decompression module 235 is configured to reconstruct each original CPRI basic frame and store the reconstructed CPRI basic frame in transmitter buffer 226 with a known frame alignment therein. CPRI decompression module 235 is further configured to identify the translated sync characters in the 8-bit-formatted data stream using method 700 that is described in more detail below in reference to FIG. 7.

Figure 3:
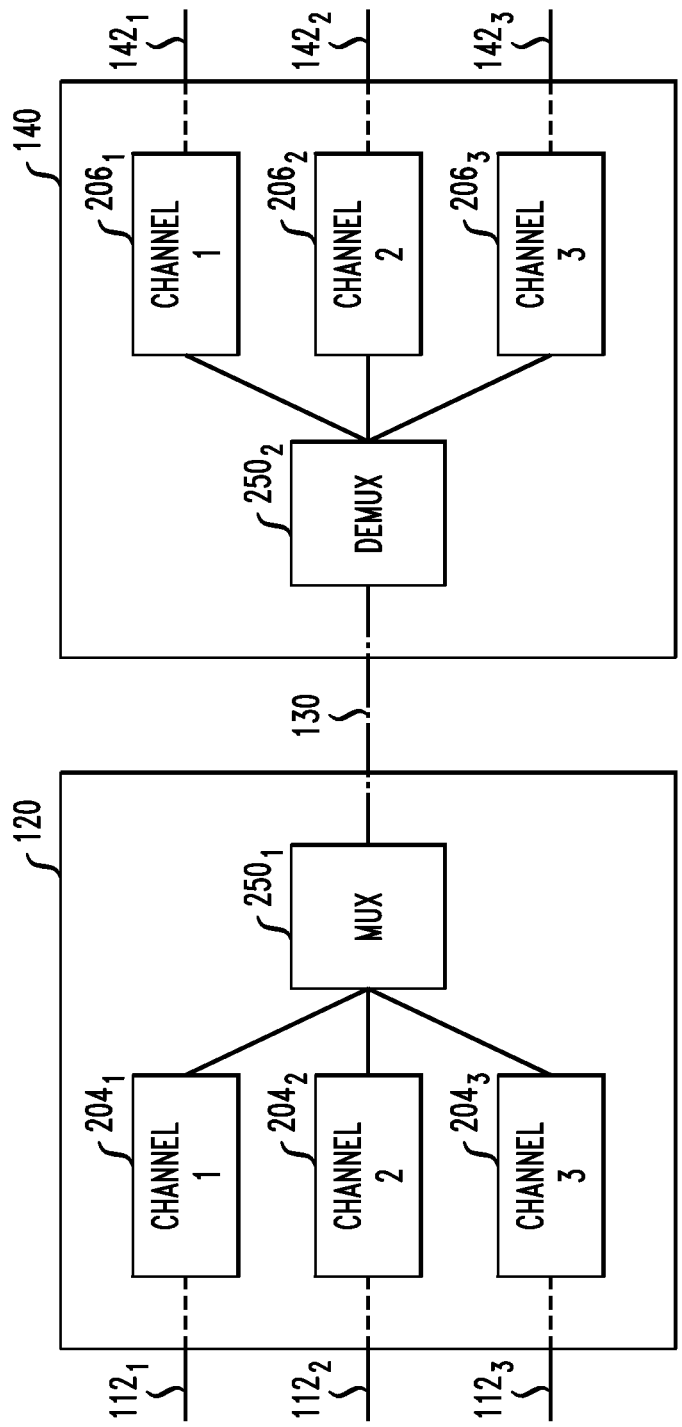
FIG. 3 shows a block diagram of a communication system according to an alternative embodiment of the disclosure.

FIG. 3 shows a block diagram of a communication system 300 according to an alternative embodiment of the disclosure. System 300 can be viewed as an embodiment of system 100 (FIG. 1) corresponding to N=3. Interfaces 120 and 140 in system 300 are implemented using electrical interface circuit 200 (FIGS. 2A-2C).

For illustration purposes, system 300 is shown as being configured for an uplink transmission. Hence, interface 120 in system 300 has three data channels 204 (also see FIG. 2B), which are labeled $204_1$-$204_3$. MUX/DEMUX 250 (also see FIG. 2A) in interface 120 of system 300 is configured to operate as a multiplexer and is labeled $250_1$. Interface 140 in system 300 similarly has three data channels 206 (also see FIG. 2C), which are labeled $206_1$-$206_3$. MUX/DEMUX 250 (also see FIG. 2A) in interface 140 of system 300 is configured to operate as a de-multiplexer and is labeled $250_2$.

One of ordinary skill in the art will understand that system 300 may alternatively be reconfigured for a downlink transmission. One of ordinary skill in the art will further understand that system 300 may also be reconfigured for a bidirectional transmission, wherein at least one corresponding pair of data channels 204/206 is configured for an uplink transmission, and at least one other corresponding pair of data channels 204/206 is configured for a downlink transmission.

Alternative embodiments of systems 100 (FIG. 1) and 300 (FIG. 3), in which interfaces 120 and 140 are connected to one another using more than one OTN link routed through optical network 130, are also contemplated. Based on the provided description, one of ordinary skill in the art will readily understand how to make and use such embodiments.

Figure 4:
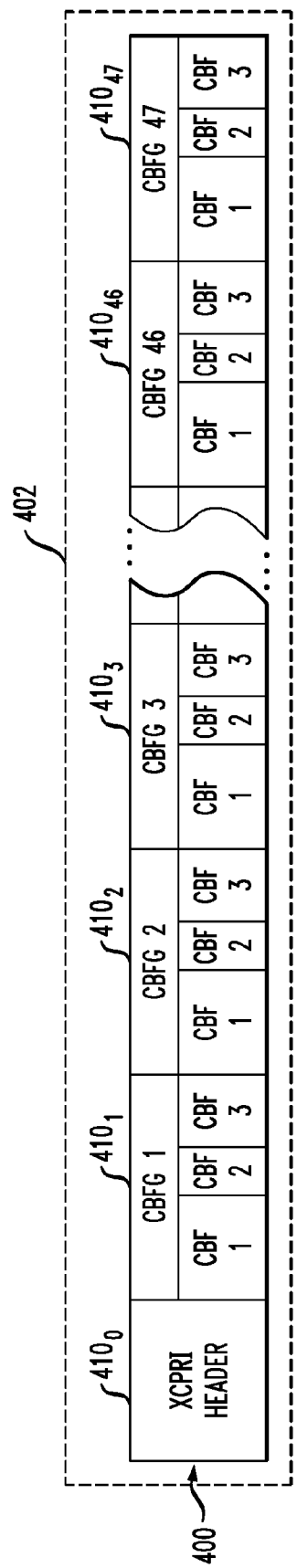
FIG. 4 pictorially shows a frame format that can be used in the communication system of FIG. 3 according to an embodiment of the disclosure.

FIG. 4 pictorially shows a frame format of a data frame 400 that can be transmitted in system 300 (FIG. 3) according to an embodiment of the disclosure. More specifically, data frame 400 is an aggregated data frame that can be used as a payload of an Optical Transport Unit (OTU) 402 transmitted between interfaces 120 and 140 of system 300 using the corresponding OTN link established, as known in the art, over optical network 130.

Data frame 400 comprises 48 sections $410_0$-$410_{47}$ of equal size. Section $410_0$ is allocated for the header (xCPRI Header) of data frame 400. Each of sections $410_1$-$410_{47}$ is configured to carry a respective CBF group (CBFG#), where CBF stands for compressed-CPRI basic frame. Each CBFG in data frame 400 comprises three CBFs, labeled as CBF1, CBF2, and CBF3, respectively. Each CBF1 is generated by data channel $204_1$ (FIG. 3) as described in reference to FIGS. 2A-2C. CBF2 and CBF3 are similarly generated by data channels $204_2$ and $204_3$ (FIG. 3), respectively. The synchronously generated set of CBF1, CBF2, and CBF3 is multiplexed in MUX $250_1$ (FIG. 3) to generate the corresponding CBFG. Since all of sections $410_1$-$410_{47}$ have the same size, some CBFGs may include padding bytes when the constituent CBFs do not fill up all of the available space in the corresponding section 410. In various embodiments, section $410_0$ may or may not be of the same size as each of sections $410_1$-$410_{47}$. Configuration data shared by interfaces 120 and 140 allow the latter interface to "know" the exact location of each of the CBFs in the received data frame 400. This knowledge enables proper demultiplexing of the CBFGs in DEMUX $250_2$ and then unpacking and decompression of the de-multiplexed CBFs in the respective channels 206 of interface 140 (FIG. 3).

Alternative embodiments of data frame 400 may be constructed to configure a CBFG to carry CBFs corresponding to any desirable (technically feasible) number of data channels.

For example, such number can be two or greater than three. Some embodiments have been implemented to carry up to eighteen CBFs per CBFG.

Figure 5:
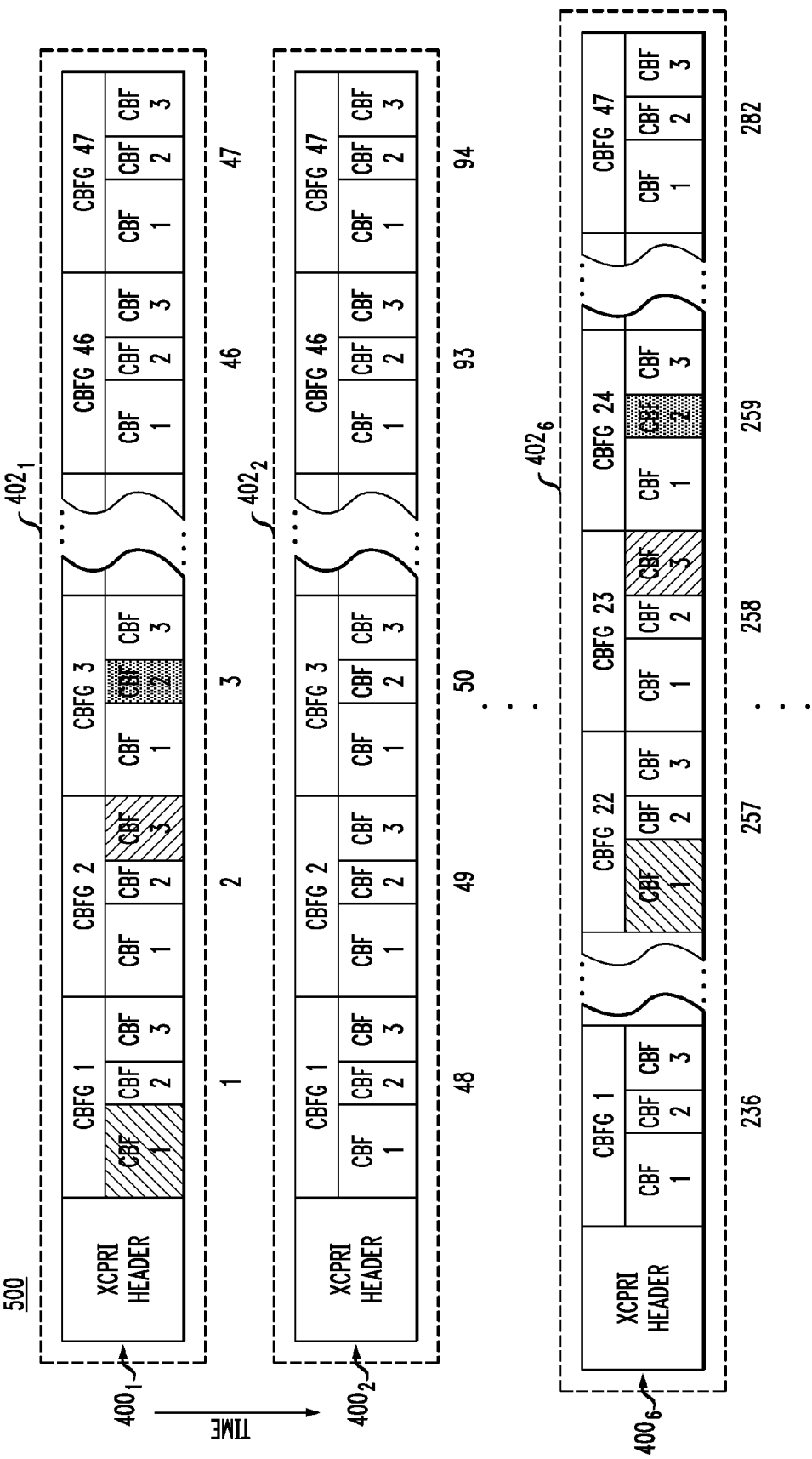
FIG. 5 pictorially shows an example occurrence of translated sync characters in a sequence of data frames of FIG. 4 according to an embodiment of the disclosure.

FIG. 5 pictorially illustrates an example occurrence of translated sync characters in a sequence 500 of OTUs 402 (FIG. 4) according to an embodiment of the disclosure. The subscript values indicate the order in which OTUs 402 and data frames 400 appear in sequence 500. Each CBF carrying a translated sync character is indicated in FIG. 5 by the corresponding shading.

For example, as indicated by the shading in FIG. 5, CBF1 in CBFG1 of data frame $400_1$ happens to have a translated sync character corresponding to a CPRI hyperframe that is being transmitted through data channels $204_1$ and $206_1$ of system 300. CBF3 in CBFG2 of data frame $400_1$ happens to have a translated sync character corresponding to a CPRI hyperframe that is being transmitted through data channels $204_3$ and $206_3$ of system 300. CBF2 in CBFG3 of data frame $400_1$ happens to have a translated sync character corresponding to a CPRI hyperframe that is being transmitted through data channels $204_3$ and $206_3$ of system 300.

In principle, a translated sync character may appear in any CBF of data frame 400. As a result, a CBFG in data frame 400 may have up to three translated sync characters. More specifically, a CBFG of data frame 400 will have three translated sync characters when each of its three constituent CBFs happens to have one. Depending on the time alignment of the CPRI hyperframes that are being transmitted through different data channels of system 300, a CBFG in a corresponding data frame 400 may have three, two, one, or zero translated sync characters.

As already indicated above, other embodiments of data frame 400 may have a different number of CBFs per CBFG and, as such, a maximum possible number of translated sync characters per CBFG that is different from three.

Since a CPRI hyperframe has a single sync character, and there are 256 CPRI basic frames per CPRI hyperframe, translated sync characters corresponding to a particular data-channel pair in system 300 appear in sequence 500 with a periodicity of 256 CBFGs. For example, a next translated sync character corresponding to data-channel pair $204_1$/$206_1$ appears in sequence 500 in CBF1 of CBFG22 of data frame $400_6$, or exactly 256 CBFGs later than the previous translated sync character, which appeared in CBF1 in CBFG1 of data frame $400_1$. A next translated sync character corresponding to data-channel pair $204_2$/$206_2$ appears in sequence 500 in CBF2 of CBFG24 of data frame $400_6$, or exactly 256 CBFGs later than the previous translated sync character, which appeared in CBF2 in CBFG3 of data frame $400_1$. A next translated sync character corresponding to data-channel pair $204_3$/$206_3$ appears in sequence 500 in CBF3 of CBFG23 of data frame $400_6$, or exactly 256

CBFGs later than the previous translated sync character, which appeared in CBF3 in CBFG2 of data frame 400₁.

Figure 6:
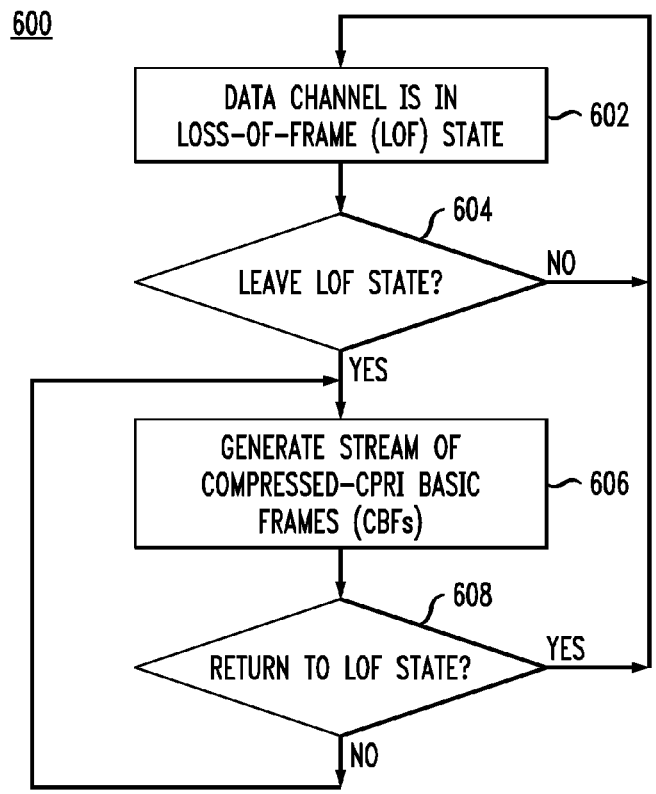
FIG. 6 shows a flowchart of a method of frame synchronization that can be used in the data channel shown in FIG. 2B according to an embodiment of the disclosure.

FIG. 6 shows a flowchart of a method 600 of frame synchronization that can be used in data channel 204 (FIG. 2B) according to an embodiment of the disclosure.

At step 602 of method 600, data channel 204 is in a loss-of-frame (LOF) state. While in the LOF state, data channel 204 zeros out its output on line 240 regardless of what is being received at port 202 (see FIG. 2B). Additional description of the LOF state can be found, e.g., in the above-cited CPRI Specifications.

At step 604, data channel 204 may be configured to leave the LOF state or, alternatively, remain in the LOF state. In an example embodiment, data channel 204 is configured to leave the LOF state after it detects a predetermined number of sync characters, e.g., the K.28.5 characters, in the data received at port 202. This predetermined number of sync characters may be as low as one. In some embodiments, the predetermined number may be greater than one. After data channel 204 has detected the predetermined number of sync characters, the processing of method 600 is directed to step 606. Otherwise, data channel 204 remains in the LOF state.

At step 606, data channel 204 is configured to generate a stream of CBFs, e.g., as described above in reference to FIG. 2B. In an example embodiment, step 606 includes the sub-steps of: (i) applying the operative 8 B/10 B line code to decode the CPRI data received at port 202 and translate them from the 10-bit format to the 8-bit format; (ii) storing the translated data in receiver buffer 224 in a manner that causes the start of each translated CPRI basic frame to be at a known location within the receiver buffer; (iii) reading out the translated CPRI basic frames from receiver buffer 224 in accordance with a common clock that synchronizes the outputs of different channels 204; (iv) packing and compressing/compacting each read-out CPRI basic frame to generate a corresponding CBF, and (v) outputting a stream of the generated CBFs on line 240 for multiplexing and aggregation into the corresponding plurality of data frames 400, and then encapsulation into the corresponding stream of OTUs 402, e.g., similar to stream 500 (FIG. 5).

Sub-step 606(i) comprises translating each 10-bit sync character into an 8-bit translated sync character. As already indicated above, an example embodiment of sub-step 606(i) may include translating the 10-bit K.28.5 character into the hexadecimal 0xbc.

At step 608, data channel 204 may be configured to return to the LOF state or, alternatively, continue to generate CBFs, e.g., by executing the above-indicated sub-steps of step 606. For example, data channel 204 may return to the LOF state of step 602 when it does not receive/detect at port 202 a next sync character at an expected time corresponding to the periodicity of one sync character per 256 CPRI basic frames.

Figure 7:
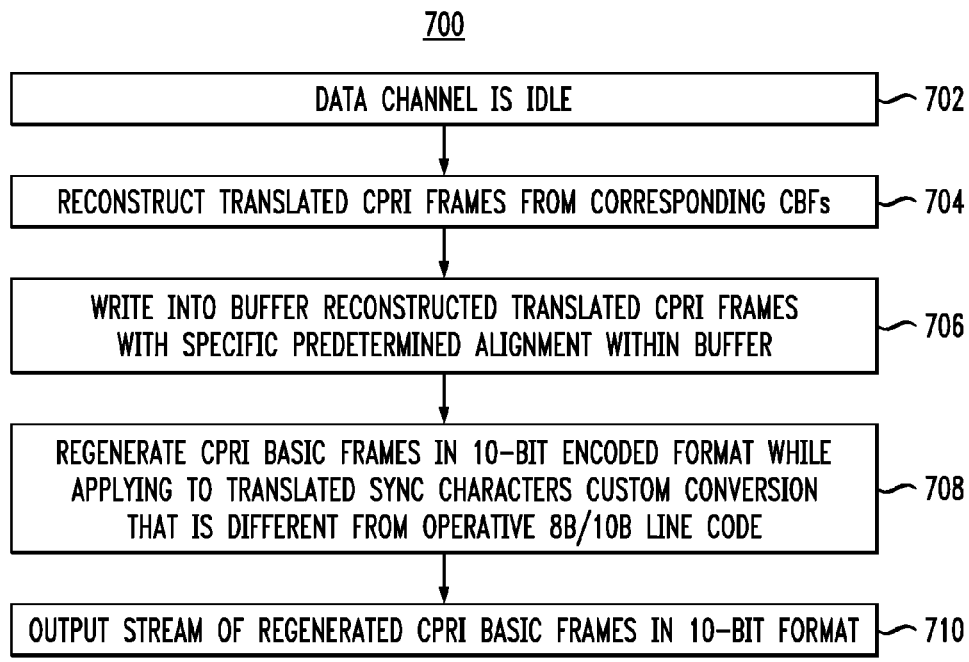
FIG. 7 shows a flowchart of a method of frame synchronization that can be used in the data channel shown in FIG. 2C according to an embodiment of the disclosure.

FIG. 7 shows a flowchart of a method 700 of frame synchronization that can be used in data channel 206 (FIG. 2C) according to an embodiment of the disclosure.

At step 702 of method 700, data channel 206 is idle. When idle, data channel 206 zeros out its output at port 202 (see FIG. 2C).

At step 704, data channel 206 is configured to reconstruct translated CPRI basic frames from the corresponding CBFs received by CPRI decompression module 235 on line 240 (see FIG. 2C). Recall that translated CPRI basic frames have data in the 8-bit format.

At step 706, data channel 206 is configured to write the output of CPRI decompression module 235 into transmitter buffer 226 such that the reconstructed translated CPRI basic frames are placed within the transmitter buffer with a specific predetermined alignment. This manner of writing data into transmitter buffer 226 causes the CPRI basic frame boundaries, control words, and translated sync characters to also be at known locations within the transmitter buffer.

At step 708, encoder 216 is configured to (i) retrieve the data from transmitter buffer 226 and (ii) use the operative 8 B/10 B line code to regenerate the CPRI basic frames in the original 10-bit encoded format. During this regeneration, the translated sync characters, which are found only at particular known locations within transmitter buffer 226, are converted back into sync characters. Because the 8-bit words that fortuitously have the same 8-bit value as the translated sync characters are located within transmitter buffer 226 at locations that are different from and do not overlap with these particular known locations, these 8-bit words are treated as payload data and converted into the corresponding 10-bit values by directly applying the operative 8 B/10 B line code.

For example, in the embodiment in which the sync character is the 10-bit K.28.5 character, and the 8-bit translated sync character is the hexadecimal 0xbc, the processing of step 708 can be carried out as follows. The 0xbc values found at the particular known locations within transmitter buffer 226 are converted into the 10-bit K.28.5 characters. In contrast, each 0xbc value found at any other location within transmitter buffer 226 is converted into the corresponding 10-bit word (which is different form the 10-bit K.28.5 character) by direct application of the operative 8 B/10 B line code.

In an example embodiment, step 708 may be implemented using the following sub-steps. Initially, encoder 216 operates to inspect the respective location in every translated CPRI basic frame where a translated sync character may be located. Some of the first inspected locations may contain zeroes. The first time encoder 216 sees a non-zero value at the inspected location, the encoder will be configured to conditionally treat that non-zero value as a translated sync character because the first non-zero character sent by the decoder end of the link is supposed to be a sync character. The condition that needs to be satisfied for encoder 216 to actually perform the above-described 8 B/10 B conversion of the translated sync character is that translated sync characters are expected to show up every 256 translated CPRI basic frames. As such, encoder 216 will need to find a predetermined number of additional translated sync characters that appear at locations corresponding to this expected periodicity. The actual value of the "predetermined number" is a parameter of the employed algorithm, and can in principle be any positive integer. Good results have been achieved, e.g., with this predetermined number being in the range from one to five. If encoder 216 finds the predetermined number of additional translated sync characters at the expected locations, then the encoder will proceed to perform the above-described 8 B/10 B conversion. Otherwise, encoder 216 will continue to check every translated CPRI basic frame for a translated sync character until one is found and verified using by checking that the above-formulated condition is satisfied.

At step 710, data channel 206 is configured to output, through port 202, a stream of the regenerated CPRI basic frames, encoded in the 10-bit format.

According to an example embodiment disclosed above in reference to FIGS. 1-7, provided is an apparatus (e.g., 100, FIG. 1) comprising a first interface device (e.g., 120 or 140, FIG. 1) configured to be coupled between a first plurality of communication links ($112_1$-$112_N$ or $142_1$-$142_N$, FIG. 1) and an optical trunk of an optical network (e.g., 130, FIG. 1) and further configured to convert data frames between a first frame format (e.g., CPRI) used for data transmission over the first plurality of communication links and a second frame format (e.g., OTN; 400, FIG. 4) used for data transmission over the optical network. The first interface device comprises: a line coder (e.g., 210, FIG. 2A) configured to interconvert sync characters that appear in the first frame format and translated sync characters that appear in the second frame format; and a buffer bank (e.g., 220, FIG. 2A) coupled to the line coder, wherein the first interface device is configured to acquire frame synchronization by temporarily storing (e.g., 706, FIG. 7) data in the buffer bank such that each of the translated sync characters is placed in the buffer bank at a respective predetermined location.

In some embodiments of the above apparatus, the first interface device is configured to distinguish a translated sync character from a payload-data word that fortuitously has an identical value based on predetermined alignment, in the buffer bank, of data temporarily stored therein for conversion into a data format for the first frame format.

In some embodiments of any of the above apparatus, a sync character has a first number of bits; a translated sync character has a second number of bits that is smaller than the first number of bits; and the line coder is configured to interconvert payload-data words between the first frame format and the second frame format by applying an n-bit/m-bit line code, where m is the first number of bits, and n is the second number of bits.

In some embodiments of any of the above apparatus, n=8 and m=10.

In some embodiments of any of the above apparatus, each of the sync characters is a 10-bit K.28.5 character; and each of the translated sync characters has a hexadecimal value of 0xbc.

In some embodiments of any of the above apparatus, n=64 and m=66.

In some embodiments of any of the above apparatus, the first frame format complies with a CPRI Specification (e.g., V6.0 (2013 Aug. 30)); and the second frame format complies with an ITU-T G.709/Y.1331 standard.

In some embodiments of any of the above apparatus, each of the translated sync characters has a designated specific binary value (e.g., 0xbc); and application of the line code to the designated specific binary value does not produce a sync character.

In some embodiments of any of the above apparatus, the first interface device further comprises a compressor/de-compressor circuit (e.g., 230, FIG. 2A) coupled to the buffer bank and configured to: compress data retrieved from the buffer bank for conversion from the first frame format to the second frame format; and decompress data for temporary storage in the buffer bank for conversion from the second frame format to the first frame format.

In some embodiments of any of the above apparatus, the line coder, the buffer bank, and compressor/de-compressor circuit are parts of a data-frame handling module (e.g., 208, FIG. 2A) having a plurality of data channels (e.g., 204, FIG. 2B; 206, FIG. 2C), each configurable to transmit data in a first direction or in a second direction, the first direction corresponding to data transmission from the first plurality of communication links to the optical trunk, and the second direction corresponding to data transmission from the optical trunk to the first plurality of communication links.

In some embodiments of any of the above apparatus, the first interface device further comprises a multiplexer/de-multiplexer (e.g., 250, FIG. 2A) configured to: multiplex data received from the plurality of data channels for further transmission in the first direction; and de-multiplex data received through the optical trunk for further transmission through the plurality of data channels in the second direction.

In some embodiments of any of the above apparatus, the apparatus further comprises a plurality of radio heads (e.g., $110_1$-$110_N$, FIG. 1), each configured to communicate with the first interface device via a respective one of the first plurality of communication links by exchanging data frames having the first frame format and further configurable for establishing and supporting one or more wireless links with one or more mobile devices.

In some embodiments of any of the above apparatus, the apparatus further comprises: a second interface device (e.g., 140, FIG. 1) nominally identical to the first interface device and coupled between an optical trunk of the optical network and a second plurality of communication links (e.g., $142_1$-$142_N$, FIG. 1); and a baseband unit (e.g., 150, FIG. 1) configured to communicate with the second interface device via the second plurality of communication links. The first interface device and the second interface device are configured to communicate with one another via the optical network by exchanging data frames having the second frame format.

In some embodiments of any of the above apparatus, the apparatus further comprises a baseband unit (e.g., 150, FIG. 1) configured to communicate with the first interface device via the first plurality of communication links by exchanging data frames having the first frame format.

In some embodiments of any of the above apparatus, a data frame of the second frame format comprises a plurality of compressed basic-frame groups (e.g., $410_1$-$410_{47}$, FIG. 4), wherein each compressed basic-frame group comprises a respective plurality of compressed basic frames, each configured to carry data corresponding to a respective one of the first plurality of communication links. In a stream of data frames of the first frame format transmitted through a first communication link of the first plurality of communication links, the sync characters appear with a periodicity of one sync character per K basic frames, where K is a positive integer greater than one. In a stream of data frames of the second frame format, the translated sync characters corresponding to the first communication link of the first plurality of communication links appear with a periodicity of one translated sync character per K compressed basic-frame groups.

In some embodiments of any of the above apparatus, K=256.

In some embodiments of any of the above apparatus, in the stream of data frames of the second frame format, the translated sync characters corresponding to a second communication link of the first plurality of communication links appear with the periodicity of one translated sync character per K compressed basic-frame groups. A compressed basic-frame group is configurable to carry any one or both of the following: (i) one of the translated sync characters corresponding to the first communication link of the first plurality of communication links; and (ii) one of the translated sync characters corresponding to the second communication link of the first plurality of communication links.

In some embodiments of any of the above apparatus, in the stream of data frames of the second frame format, the translated sync characters corresponding to a second communication link of the first plurality of communication links appear with the periodicity of one translated sync character per K compressed basic-frame groups. In the stream of data frames of the second frame format, the translated sync characters corresponding to a third communication link of the first plurality of communication links appear with the periodicity of one translated sync character per K compressed basic-frame groups. A compressed basic-frame group is configurable to carry any one, two, or three of the following: (i) one of the translated sync characters corresponding to the first communication link of the first plurality of communication links; (ii) one of the translated sync characters corresponding to the second communication link of the first plurality of communication links; and (iii) one of the translated sync characters corresponding to the third communication link of the first plurality of communication links.

In some embodiments of any of the above apparatus, the first interface device is configured to perform optical-to-electrical-to-optical conversion of communication signals transmitted between the first plurality of communication links and the optical trunk of the optical network.

According to another example embodiment disclosed above in reference to FIGS. 1-7, provided is a communication method comprising the step of converting data frames between a first frame format (e.g., CPRI) used for data transmission over a first plurality of communication links and a second frame format (e.g., OTN; 400, FIG. 4) used for data transmission over an optical network. The step of converting comprises the sub-steps of: inter-converting, using a line coder (e.g., 210, FIG. 2A), sync characters that appear in the first frame format and translated sync characters that appear in the second frame format; and acquiring frame synchronization by temporarily storing (e.g., 706, FIG. 7) data in a buffer bank (e.g., 220, FIG. 2A) coupled to the line coder such that each of the translated sync characters is placed in the buffer bank at a respective predetermined location.

In some embodiments of the above method, each of the translated sync characters has a designated specific binary value (e.g., 0xbc) different from a binary value of each of the sync characters. The step of converting further comprises the sub-step of applying a line code to convert the data words stored in the buffer bank at locations different from the respective predetermined locations into corresponding converted data words configured for the first frame format, wherein application of the line code to the designated specific binary value does not produce a sync character.

While this disclosure includes references to illustrative embodiments, this specification is not intended to be construed in a limiting sense.

For example, based on the provided description, one of ordinary skill in the art will understand how to make and use alternative embodiments in which synchronous data traffic transmitted over a dedicated link and then applied to an interface of a packet-based transport system or network uses a periodic, encoded sync or framing character, wherein the interface is configured to strip the line encoding used in the dedicated link and instead apply a different data-protection and/or error-correction scheme compatible with the protocols used in the packet-based transport system.

Some embodiments may use frame formats that are different from the frame format shown in FIG. 4.

As used herein, the term "baseband unit" should be construed to cover various implementations of Radio Equipment Control (REC).

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The functions of the various elements shown in the figures, including any functional blocks labeled as "processors," may be provided through the use of dedicated hardware as well as hardware capable of executing software in association with appropriate software. Moreover, various disclosed circuits may include hardware capable of executing software, and may implicitly include, without limitation, digital signal processor (DSP) hardware, an application specific integrated circuit (ASIC), a field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a processor or other suitable electronic circuit, whether or not such processor or circuit is explicitly shown.

What is claimed is:

1. An apparatus comprising a first interface device configured to be coupled between a first plurality of communication links and an optical trunk of an optical network and further configured to convert data frames between a first frame format used for data transmission over the first plurality of communication links and a second frame format used for data transmission over the optical network, wherein the first interface device comprises:
    a line coder configured to interconvert sync characters that appear in the first frame format and translated sync characters that appear in the second frame format; and
    a buffer bank coupled to the line coder, wherein the first interface device is configured to acquire frame synchronization by temporarily storing data in the buffer bank such that each of the translated sync characters is placed in the buffer bank at a respective predetermined location; and
    wherein the first interface device is configured to distinguish a translated sync character from a payload-data word that fortuitously has an identical value based on predetermined alignment, in the buffer bank, of data temporarily stored therein for conversion into the first frame format.

2. The apparatus of claim 1, wherein:
    a sync character has a first number of bits;
    a translated sync character has a second number of bits that is smaller than the first number of bits; and
    the line coder is configured to interconvert payload-data words between the first frame format and the second frame format by applying an n-bit/m-bit line code, where m is the first number of bits, and n is the second number of bits.

3. The apparatus of claim 2, wherein n=8 and m=10.

4. The apparatus of claim 3, wherein:
    each of the sync characters is a 10-bit K.28.5 character; and
    each of the translated sync characters has a hexadecimal value of 0xbc.

5. The apparatus of claim 2, wherein n=64 and m=66.

6. The apparatus of claim 1, wherein:
    the first frame format complies with a CPRI Specification; and
    the second frame format complies with an ITU-T G.709/Y.1331 standard.

7. The apparatus of claim 1, wherein:
    each of the translated sync characters has a designated specific binary value; and
    application of the line code to the designated specific binary value does not produce a sync character.

8. The apparatus of claim 1, wherein the first interface device further comprises a compressor/de-compressor circuit coupled to the buffer bank and configured to:
    compress data retrieved from the buffer bank for conversion from the first frame format to the second frame format; and
    decompress data for temporary storage in the buffer bank for conversion from the second frame format to the first frame format.

9. The apparatus of claim 8,
    wherein the line coder, the buffer bank, and compressor/de-compressor circuit are parts of a data-frame handling module having a plurality of data channels, each configurable to transmit data in a first direction or in a second direction, the first direction corresponding to data transmission from the first plurality of communication links to the optical trunk, and the second direction corresponding to data transmission from the optical trunk to the first plurality of communication links; and
    wherein the first interface device further comprises a multiplexer/de-multiplexer configured to:
        multiplex data received from the plurality of data channels for further transmission in the first direction; and
        de-multiplex data received through the optical trunk for further transmission through the plurality of data channels in the second direction.

10. The apparatus of claim 1, further comprising a plurality of radio heads, each configured to communicate with the first interface device via a respective one of the first plurality of communication links by exchanging data frames having the first frame format and further configurable for establishing and supporting one or more wireless links with one or more mobile devices.

11. The apparatus of claim 10, further comprising:
    a second interface device nominally identical to the first interface device and coupled between an optical trunk of the optical network and a second plurality of communication links; and
    a baseband unit configured to communicate with the second interface device via the second plurality of communication links; and
    wherein the first interface device and the second interface device are configured to communicate with one another via the optical network by exchanging data frames having the second frame format.

12. The apparatus of claim 1, further comprising a baseband unit configured to communicate with the first interface device via the first plurality of communication links by exchanging data frames having the first frame format.

13. The apparatus of claim 1, wherein:
    a data frame of the second frame format comprises a plurality of compressed basic-frame groups, wherein each compressed basic-frame group comprises a respective plurality of compressed basic frames, each configured to carry data corresponding to a respective one of the first plurality of communication links; and in a stream of data frames of the first frame format transmitted through a first communication link of the first plurality of communication links, the sync characters appear with a periodicity of one sync character per K basic frames, where K is a positive integer greater than one; and in a stream of data frames of the second frame format, the translated sync characters corresponding to the first communication link of the first plurality of communication links appear with a periodicity of one translated sync character per K compressed basic-frame groups.

14. The apparatus of claim 13, wherein K=256.

15. The apparatus of claim 13, wherein:

in the stream of data frames of the second frame format, the translated sync characters corresponding to a second communication link of the first plurality of communication links appear with the periodicity of one translated sync character per K compressed basic-frame groups; and a compressed basic-frame group is configurable to carry any one or both of the following:
one of the translated sync characters corresponding to the first communication link of the first plurality of communication links; and
one of the translated sync characters corresponding to the second communication link of the first plurality of communication links.

16. The apparatus of claim 13, wherein:

in the stream of data frames of the second frame format, the translated sync characters corresponding to a second communication link of the first plurality of communication links appear with the periodicity of one translated sync character per K compressed basic-frame groups;

in the stream of data frames of the second frame format, the translated sync characters corresponding to a third communication link of the first plurality of communication links appear with the periodicity of one translated sync character per K compressed basic-frame groups; and a compressed basic-frame group is configurable to carry any one, two, or three of the following:
one of the translated sync characters corresponding to the first communication link of the first plurality of communication links;
one of the translated sync characters corresponding to the second communication link of the first plurality of communication links; and
one of the translated sync characters corresponding to the third communication link of the first plurality of communication links.

17. The apparatus of claim 1, wherein the first interface device is configured to perform optical-to-electrical-to-optical conversion of communication signals transmitted between the first plurality of communication links and the optical trunk of the optical network.

18. A communication method comprising converting data frames between a first frame format used for data transmission over a first plurality of communication links and a second frame format used for data transmission over an optical network, wherein said converting comprises:

inter-converting, using a line coder, sync characters that appear in the first frame format and translated sync characters that appear in the second frame format; and acquiring frame synchronization by temporarily storing data in a buffer bank coupled to the line coder such that each of the translated sync characters is placed in the buffer bank at a respective predetermined location, wherein:
each of the translated sync characters has a designated specific binary value different from a binary value of the sync characters;
said converting further comprises applying a line code to convert the data words stored in the buffer bank at locations different from the respective predetermined locations into corresponding converted data words configured for the first frame format; and
application of the line code to the designated specific binary value does not produce a sync character.

19. An apparatus comprising a first interface device configured to be coupled between a first plurality of communication links and an optical trunk of an optical network and further configured to convert data frames between a first frame format used for data transmission over the first plurality of communication links and a second frame format used for data transmission over the optical network, wherein the first interface device comprises:

a line coder configured to interconvert sync characters that appear in the first frame format and translated sync characters that appear in the second frame format; and a buffer bank coupled to the line coder, wherein the first interface device is configured to acquire frame synchronization by temporarily storing data in the buffer bank such that each of the translated sync characters is placed in the buffer bank at a respective predetermined location, wherein:
each of the translated sync characters has a designated specific binary value; and
application of the line code to the designated specific binary value does not produce a sync character.

20. An apparatus comprising a first interface device configured to be coupled between a first plurality of communication links and an optical trunk of an optical network and further configured to convert data frames between a first frame format used for data transmission over the first plurality of communication links and a second frame format used for data transmission over the optical network, wherein the first interface device comprises:

a line coder configured to interconvert sync characters that appear in the first frame format and translated sync characters that appear in the second frame format; and a buffer bank coupled to the line coder, wherein the first interface device is configured to acquire frame synchronization by temporarily storing data in the buffer bank such that each of the translated sync characters is placed in the buffer bank at a respective predetermined location; and wherein the first interface device further comprises a compressor/de-compressor circuit coupled to the buffer bank and configured to:
compress data retrieved from the buffer bank for conversion from the first frame format to the second frame format; and
decompress data for temporary storage in the buffer bank for conversion from the second frame format to the first frame format;

wherein the line coder, the buffer bank, and compressor/de-compressor circuit are parts of a data-frame handling module having a plurality of data channels, each configurable to transmit data in a first direction or in a second direction, the first direction corresponding to data transmission from the first plurality of communication links to the optical trunk, and the second direction corresponding to data transmission from the optical trunk to the first plurality of communication links; and wherein the first interface device further comprises a multiplexer/de-multiplexer configured to:
multiplex data received from the plurality of data channels for further transmission in the first direction; and
de-multiplex data received through the optical trunk for further transmission through the plurality of data channels in the second direction.

21. An apparatus comprising a first interface device configured to be coupled between a first plurality of communication links and an optical trunk of an optical network and further configured to convert data frames between a first frame format used for data transmission over the first plurality of communication links and a second frame format used for data transmission over the optical network, wherein the first interface device comprises:
a line coder configured to interconvert sync characters that appear in the first frame format and translated sync characters that appear in the second frame format; and
a buffer bank coupled to the line coder, wherein the first interface device is configured to acquire frame synchronization by temporarily storing data in the buffer bank such that each of the translated sync characters is placed in the buffer bank at a respective predetermined location, wherein:
a data frame of the second frame format comprises a plurality of compressed basic-frame groups, wherein each compressed basic-frame group comprises a respective plurality of compressed basic frames, each configured to carry data corresponding to a respective one of the first plurality of communication links; and
in a stream of data frames of the first frame format transmitted through a first communication link of the first plurality of communication links, the sync characters appear with a periodicity of one sync character per K basic frames, where K is a positive integer greater than one; and
in a stream of data frames of the second frame format, the translated sync characters corresponding to the first communication link of the first plurality of communication links appear with a periodicity of one translated sync character per K compressed basic-frame groups.

22. The apparatus of claim 21, wherein K=256.

23. The apparatus of claim 21, wherein:
in the stream of data frames of the second frame format, the translated sync characters corresponding to a second communication link of the first plurality of communication links appear with the periodicity of one translated sync character per K compressed basic-frame groups; and
a compressed basic-frame group is configurable to carry any one or both of the following:
one of the translated sync characters corresponding to the first communication link of the first plurality of communication links; and
one of the translated sync characters corresponding to the second communication link of the first plurality of communication links.

24. The apparatus of claim 21, wherein:
in the stream of data frames of the second frame format, the translated sync characters corresponding to a second communication link of the first plurality of communication links appear with the periodicity of one translated sync character per K compressed basic-frame groups;
in the stream of data frames of the second frame format, the translated sync characters corresponding to a third communication link of the first plurality of communication links appear with the periodicity of one translated sync character per K compressed basic-frame groups; and
a compressed basic-frame group is configurable to carry any one, two, or three of the following:
one of the translated sync characters corresponding to the first communication link of the first plurality of communication links;
one of the translated sync characters corresponding to the second communication link of the first plurality of communication links; and
one of the translated sync characters corresponding to the third communication link of the first plurality of communication links.

* * * * *